United States Patent

Imani et al.

Patent Number: 5,261,273
Date of Patent: Nov. 16, 1993

[54] SYSTEM FOR DETECTING PNEUMATIC PRESSURE IN TIRE

[75] Inventors: Yuichi Imani, Hamamatsu; Takeshi Sawada, Anjo, both of Japan

[73] Assignee: Nippondenso Co., Ltd., Kariya, Japan

[21] Appl. No.: 735,025

[22] Filed: Jul. 24, 1991

[30] Foreign Application Priority Data

Jul. 24, 1990 [JP] Japan .................. 2-195825

[51] Int. Cl.⁵ .............................. B60C 23/02
[52] U.S. Cl. .................. 73/146.5; 73/728; 340/448
[58] Field of Search .............. 73/146.5, 146.8, 146.4, 73/146.2, 728; 340/448, 442, 445, 447

[56] References Cited

U.S. PATENT DOCUMENTS

| | | | |
|---|---|---|---|
| 2,239,676 | 4/1941 | Henry | 73/146.5 |
| 3,977,355 | 8/1976 | Lorenz et al. | 73/146.5 |
| 4,619,137 | 10/1986 | Bott | 73/146.5 |
| 4,742,712 | 5/1988 | Kokubu | 73/146.5 |

FOREIGN PATENT DOCUMENTS

| | | |
|---|---|---|
| 48-43681 | 6/1973 | Japan . |
| 50-879 | 1/1975 | Japan . |
| 59-146748 | 10/1984 | Japan . |
| 62-218208 | 9/1987 | Japan . |
| 62-257039 | 11/1987 | Japan . |
| 63-501065 | 4/1988 | Japan . |
| 63-501864 | 7/1988 | Japan . |
| 63-502740 | 10/1988 | Japan . |
| 63-502743 | 10/1988 | Japan . |
| 1-293209 | 11/1989 | Japan . |

Primary Examiner—Donald O. Woodiel
Attorney, Agent, or Firm—Cushman, Darby & Cushman

[57] ABSTRACT

The pneumatic pressure in a tire on a wheel of a vehicle is introduced into a pressure chamber positioned at a central axis about which the tire is rotatable through a communication passage defined in the wheel. When the pneumatic pressure in the pressure chamber varies, a diaphragm or bellows attached over the pressure chamber is elastically displaced, axially moving a slide bar extending axially through a wheel shaft on which the wheel is supported. The movement of the slide bar displaces a ferromagnetic member in a coil, whose inductance then varies. The change in the coil inductance is detected by an electronic control unit, which transmits a signal to a display unit.

17 Claims, 5 Drawing Sheets

SYSTEM FOR DETECTING PNEUMATIC PRESSURE IN TIRE

BACKGROUND OF THE INVENTION

1. Field of the Invention

The present invention relates to a system for detecting the pneumatic pressure in a tire for vehicles.

2. Description of the Prior Art

Known systems for detecting the pneumatic pressure in tires are disclosed in Japanese Patent Publications Nos. 51-9639 and 56-10202, for example.

According to the tire pressure detecting system disclosed in the former publication, when the pneumatic pressure in a tire on a vehicle drops below a certain predetermined pressure level while the vehicle is running, a lock member which has engaged a shunt block under the tire pressure is displaced out of locking engagement with the shunt block. The shunt block is now turned away from a magnet under centrifugal forces produced by the tire, and the magnetic flux from the magnet turns on a reed switch to produce a warning signal.

The tire pressure detecting system disclosed in the latter publication has a plunger which is normally biased in locking engagement with a shaft under the tire pressure, the shaft being coupled to a magnet. When the pneumatic pressure in a tire on a vehicle drops below a certain predetermined pressure level while the vehicle is running, the plunger is displaced out of locking engagement with the shaft, and the magnet is turned under the bias of a spring, causing a reed switch to produce a warning signal. When the vehicle comes to a stop, the magnet is automatically returned to an initial position by a spring-biased actuator which has been angularly displaced under centrifugal forces produced by the tire during rotation thereof.

Therefore, the above known tire pressure detecting system can detect when the pneumatic pressure in the tire has dropped below a predetermined pressure level.

Another tire pressure detecting device disclosed in Japanese Laid-Open Utility Model Publication No. 59-146748 serves to linearly detect the pneumatic pressure in a tire. The disclosed tire pressure detecting device has a spring which expands or contracts depending on the pneumatic pressure in a tire. The pneumatic pressure in the tire is linearly detected depending on the position of a magnet which is angularly movable as the spring is displaced.

The tire pressure detecting systems disclosed in Japanese Patent Publications Nos. 51-9639 and 56-10202 are not capable of linearly detecting the pneumatic pressure in a tire. Furthermore, since the shunt block is angularly moved under centrifugal forces during rotation of the tire, the pneumatic pressure in the tire cannot be detected when the vehicle is at rest in Japanese Patent Publication No. 51-9639. In Japanese Patent Publication No. 56-10202, the magnet is not automatically returned to the initial position if the pneumatic pressure in the tire drops while the vehicle is held at rest. The tire pressure detecting device shown in Japanese Laid-Open Utility Model Publication No. 59-146748 cannot effect accurate detection of the tire pressure because the spring and the magnet are also subject to centrifugal forces produced by the tire.

SUMMARY OF THE INVENTION

In view of the aforesaid problems of the conventional tire pressure detecting systems and device, it is an object of the present invention to provide a system for linearly detecting the pneumatic pressure in a tire on a vehicle with high accuracy irrespective of whether the vehicle is running or at rest, without being adversely affected by centrifugal forces generated by the tire as it rotates.

According to the present invention, there is provided a system for detecting the pneumatic pressure in a tire on a wheel of a vehicle, comprising pressure detecting means for detecting the pneumatic pressure in the tire, the pressure detecting means being disposed at a central axis about which the tire is rotatable, the pressure detecting means comprising a displaceable assembly which is displaceable along the central axis in response to a change in the pneumatic pressure in the tire, and a detector for generating an electric signal in response to the displacement of the displaceable element.

According to the present invention, there is also provided a system for detecting the pneumatic pressure in a tire on a wheel of a vehicle, comprising a pressure-responsive assembly positioned at a central axis about which the tire is rotatable. The pressure-responsive assembly is substantially free from centrifugal forces generated when the wheel rotates. The pressure-responsive assembly comprises a displaceable assembly which is displaceable along the central axis in response to a change in the pneumatic pressure in the tire, and a pressure detector operatively coupled to the displaceable assembly and including an electric signal generator for generating an electric signal in response to the displacement of the displaceable assembly.

According to the present invention, there is further provided a system for detecting the pneumatic pressure in a tire on a wheel of a vehicle, comprising a pressure chamber positioned at a central axis about which the tire is rotatable, a passage defined in the wheel and providing communication between the pressure chamber and the interior of the tire, a diaphragm positioned at the central axis and displaceable, in response to a change in the pneumatic pressure in the pressure chamber, in a direction in which the diaphragm is substantially free from centrifugal forces generated when the tire rotates, a displacement-responsive member operatively coupled to the diaphragm and movable in response to the displacement of the diaphragm, and a detector for generating an electric signal corresponding to a position to which the displacement-responsive member has moved.

According to the present invention, there is also provided a system for detecting the pneumatic pressure in a tire on a wheel of a vehicle, comprising a pressure chamber positioned at a central axis about which the tire is rotatable, a communication passage by which the pressure chamber and the interior of the tire are held in communication with each other, displaceable means disposed at the central axis and rotatable with the tire, for displacement along the central axis in response to a change in the pneumatic pressure in the tire as occurring in the pressure chamber, a slide bar slidably held against a center of the displaceable means and slidable along the central axis in response to the displacement of the displaceable means, and detecting means for detecting the displacement of the slide bar as indicating the change in the pneumatic pressure in the tire.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
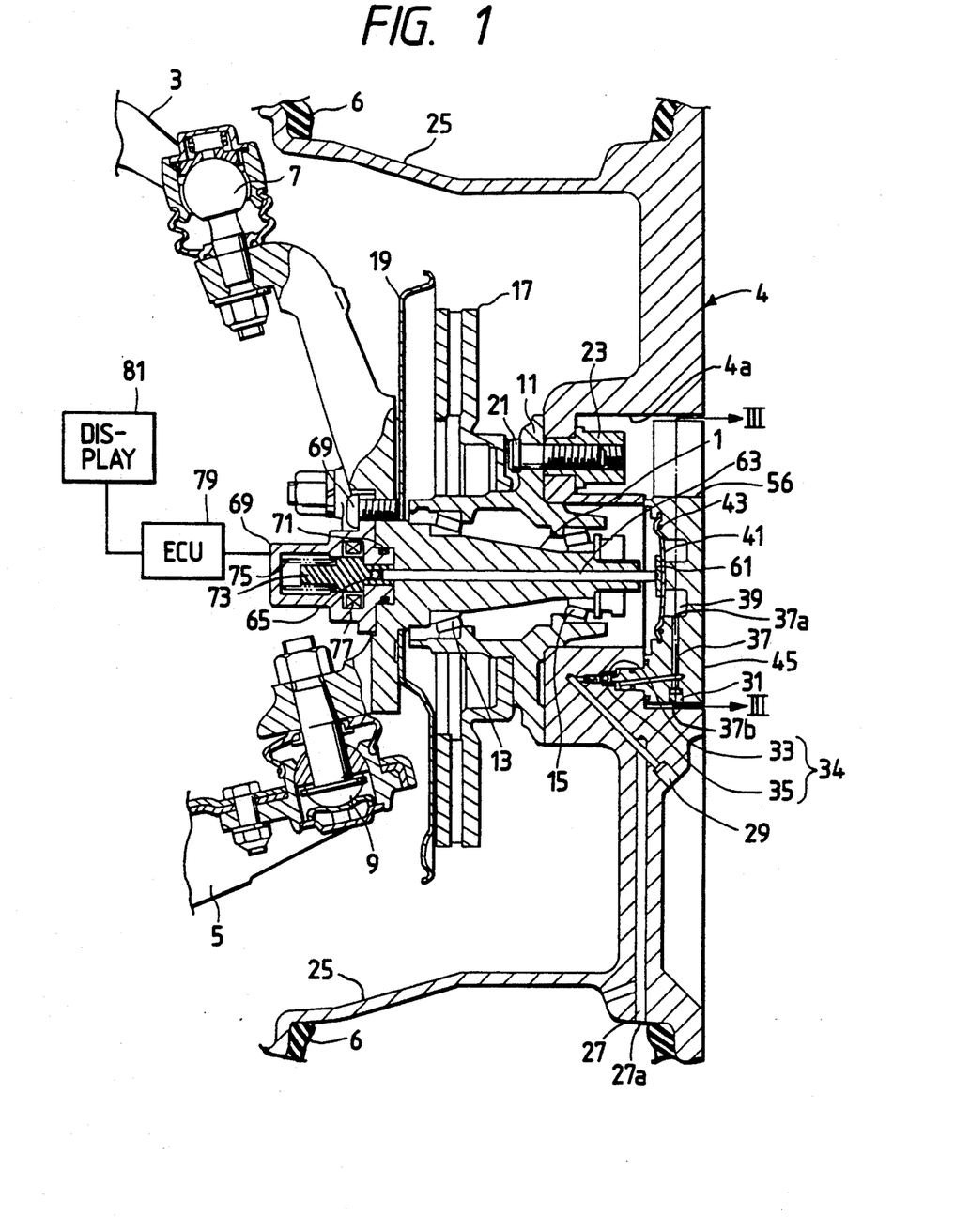
FIG. 1 is a cross-sectional view, partly in block form, of a system for detecting the pneumatic pressure in a tire according to an embodiment of the present invention, the tire being mounted on a driven wheel of a vehicle.

FIG. 1 shows in cross section a system for detecting the pneumatic pressure in a tire according to an embodiment of the present invention, the tire being mounted or a driven wheel of a vehicle.

As shown in FIG. 1, a wheel shaft 1 is angularly movably coupled through ball-and-socket joints 7, 9 to suspension arms 3, 5 which are connected to the body of a vehicle, which may typically be an automobile. While the wheel shaft 1 is angularly movable with respect to the suspension arms 3, 5, it does not rotate with a wheel 4 and a tire 6 which are supported on the wheel shaft 1.

A hub 11 is rotatably supported on the wheel shaft 1 by taper bearings 13, 15. A brake disc wheel 17 is mounted on the hub 11 for rotation therewith. The brake disc wheel 17 is partly covered with a disc cover 19. The wheel 4 includes a rim 25 on which the tire is mounted, the rim 25 being fastened to the hub 11 by bolts 21 and nuts 23 threaded over the bolts 21. The rim 25 has a communication hole 27 defined generally radially therein for introducing air therethrough from within the tire 6. The communication hole 27 has an open end 27a opening into the tire and an intermediate opening 27b that is closed off by a blind plug 29. The communication hole 27 communicates with another communication hole 37 through a check valve 34 which comprises a rubber valve 33 and a ball 35. The communication hole 37 is defined in a diaphragm attachment 45 which is positioned in a radially central hole 4a of the wheel 4. The communication hole 37 has an open end 37a opening into a pressure chamber 39 defined in the diaphragm attachment 45 and opening toward the wheel shaft 1, and an intermediate opening 37b that is closed off by a blind plug 31. The blind plug 31 has a tapered end 55 (see FIG. 2).

Similarly, the blind plug 29 has a tapered end. The air in the tire 4 can be introduced into the pressure chamber 39 through the communication hole 27, the check valve 34, and the communication hole 37. The air is prevented from leaking out of the communication holes 27, 37 by the blind plugs 29, 31. An elastically displaceable element 41 in the form of a plain diaphragm is joined through an O-ring 43 to the diaphragm attachment 45 around the pressure chamber 39 for thereby preventing air from leaking out of the pressure chamber 39.

Figure 2:
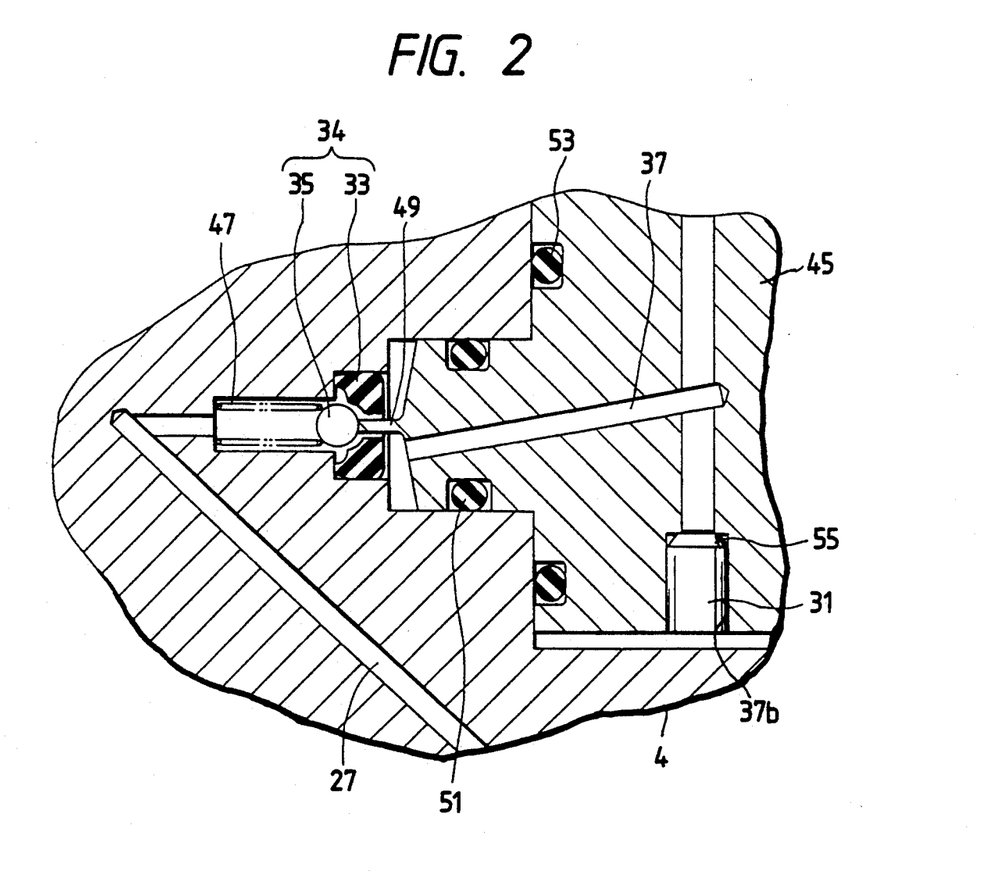
FIG. 2 is an enlarged fragmentary cross-sectional view of a check valve in the system shown in FIG. 1.

As shown in FIG. 2, the ball 35 is normally urged to the right, i.e., toward the central wheel member 45, under the bias of a spring 47. Before the diaphragm attachment 45 is assembled into the wheel 4, the ball 35 is held against the rubber valve 33 by the spring 47, and hence the check valve 34 prevents the air in the tire 6 from leaking out through the communication hole 27. When the diaphragm attachment 45 is assembled into the wheel 4, the ball 35 is lifted off the rubber valve 33 by a finger 49 of the diaphragm attachment 45 which is inserted centrally through the rubber valve 33. Now, the interior of the tire 6 communicates with the pressure chamber 39 through the communication hole 27, the check valve 34, and the communication hole 37, so that the air in the tire 6 is introduced into the pressure chamber 39. The diaphragm attachment 45 is placed in the wheel 4 with O-rings 51, 53 interposed therebetween which provide a hermetic seal that prevents air from leaking out around the diaphragm attachment 45.

In FIG. 1, the diaphragm attachment 45 is made of a light alloy such as aluminum. The diaphragm 41 is made of a metal such as beryllium, and fixed to a peripheral edge of the diaphragm attachment 45 by staking. The diaphragm attachment 45 which is positioned in the central hole 4a of the is fastened to the wheel 4 by bolts and nuts (not shown).

Figure 3:
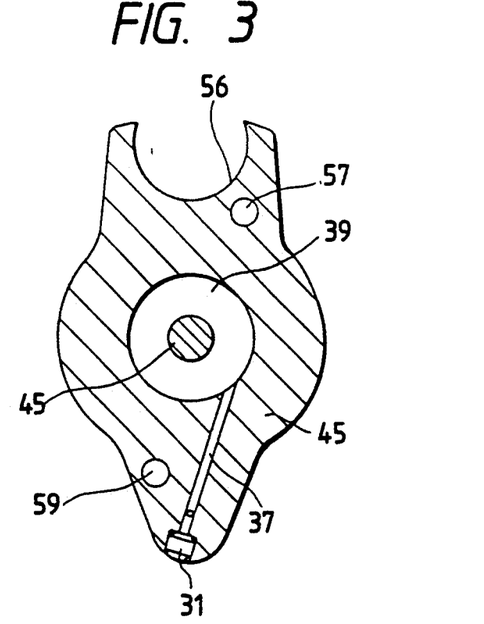
FIG. 3 is a cross-sectional view taken along line III—III of FIG. 1.

As shown in FIG. 3, the diaphragm attachment 45 has a recess 56 defined in one end thereof. The recess 56 allows a socket wrench or the like to be inserted therethrough to tighten or loosen one of the nuts 23. The diaphragm attachment 45 also has a pair of bolt holes 57, 59 for insertion therethrough of the bolts that fasten the diaphragm attachment 45 to the wheel 4.

As illustrated in FIG. 1, a wear-resistant plate 61 of a wear-resistant, heat-resistant material such as ceramic is bonded to a central area of the surface of the diaphragm 41 which faces the wheel shaft 1. The central area of the diaphragm 41 also serves as a central axis about which the tire 6 rotates. A slide bar 63 is loosely inserted, with a clearance, through a central axial hole defined in the wheel shaft 1. The slide bar 63 has one end fitted in a circular recess defined in the center of the wear-resistant plate 61, and the other end held against a ball 65 that is positioned in a rod 73, which is made of a ferromagnetic material such as iron.

A housing 67 is fixed to the wheel shaft 1 by a bolt 69 with an O-ring 71 interposed therebetween to provide a hermetic seal. The rod 73 is slidably disposed in the housing 67 on one side of the slide bar 63 remote from the diaphragm 41, and is normally urged axially to the right, i.e., toward the wheel shaft 1, by a spring 75 which is also accommodated in the housing 67. The rod 73 can also axially be moved to the left by the slide bar 63 through the ball 65.

A detector coil 77 is disposed around the rod 73 in the housing 67. The detector coil 77 is electrically connected to an electronic control unit (ECU) 79 so that an electric signal produced by the detector coil 77 can be sent to the ECU 79. In response to the signal from the detector coil 77, the ECU 79 transmits a display signal to a display unit 81, which may comprise a liquid crystal display unit.

Operation of the system shown in FIGS. 1, 2, and 3 will be described below. While the vehicle is running, the tire 6, the wheel 4, the diaphragm attachment 45, the hub 11, and the brake disc wheel 17 rotate in unison with each other. At this time, the wear-resistant plate 61 also rotates with the diaphragm attachment 45, but the slide bar 63 which is disposed centrally in the wheel shaft 1 does not rotate with its outer end slidably engaging the center of the wear resistant plate 61.

Figure 4:
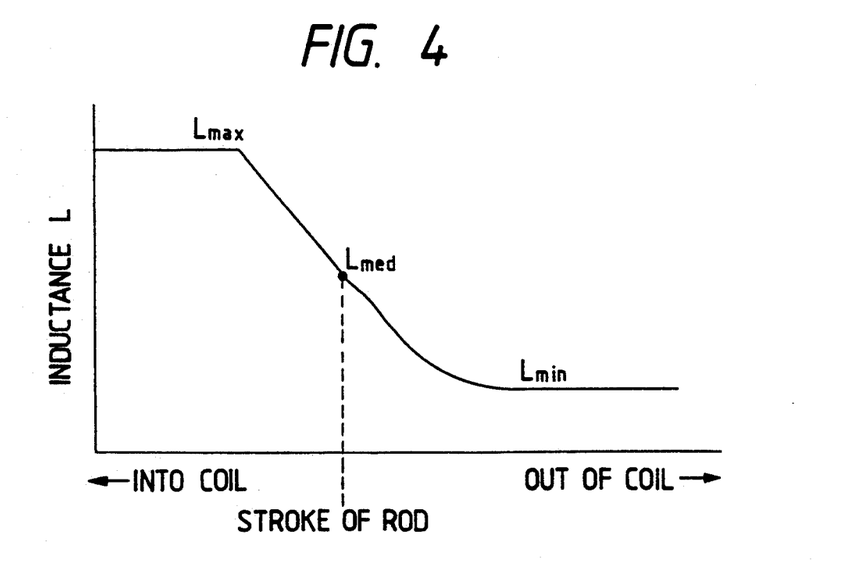
FIG. 4 is a graph showing the relationship between the stroke of a rod and the inductance of a detector coil in the system shown in FIG. 1.

When the pneumatic pressure in the tire 6 varies, since the pressure chamber 39 communicates with the interior of the tire 6 through the communication holes 27, 37 and the check valve 34, the pressure in the pressure chamber 39 also varies, displacing the diaphragm 41 with respect to the diaphragm attachment 45. The slide bar 63 held against the wear-resistant plate 61 also slides axially in response to the displacement of the diaphragm 41. Inasmuch as the slide bar 63 is slidably held at one end against the central axis about which the tire 6 rotates, the axial displacement of the slide bar 63 is not adversely affected at all by centrifugal forces which are produced when the tire 6 rotates. The rod 73 is axially displaced with respect to the detector coil 77, so that the inductance L of the detector coil 77 varies. The relationship between the axial stroke of the rod 73 and the inductance L of the detector coil 77 is shown in FIG. 4.

A signal indicative of the variation in the inductance L is sent from the detector coil 77 to the ECU 79, which then controls the display unit 81 to display the change in the pneumatic pressure in the tire 6.

Figure 5:
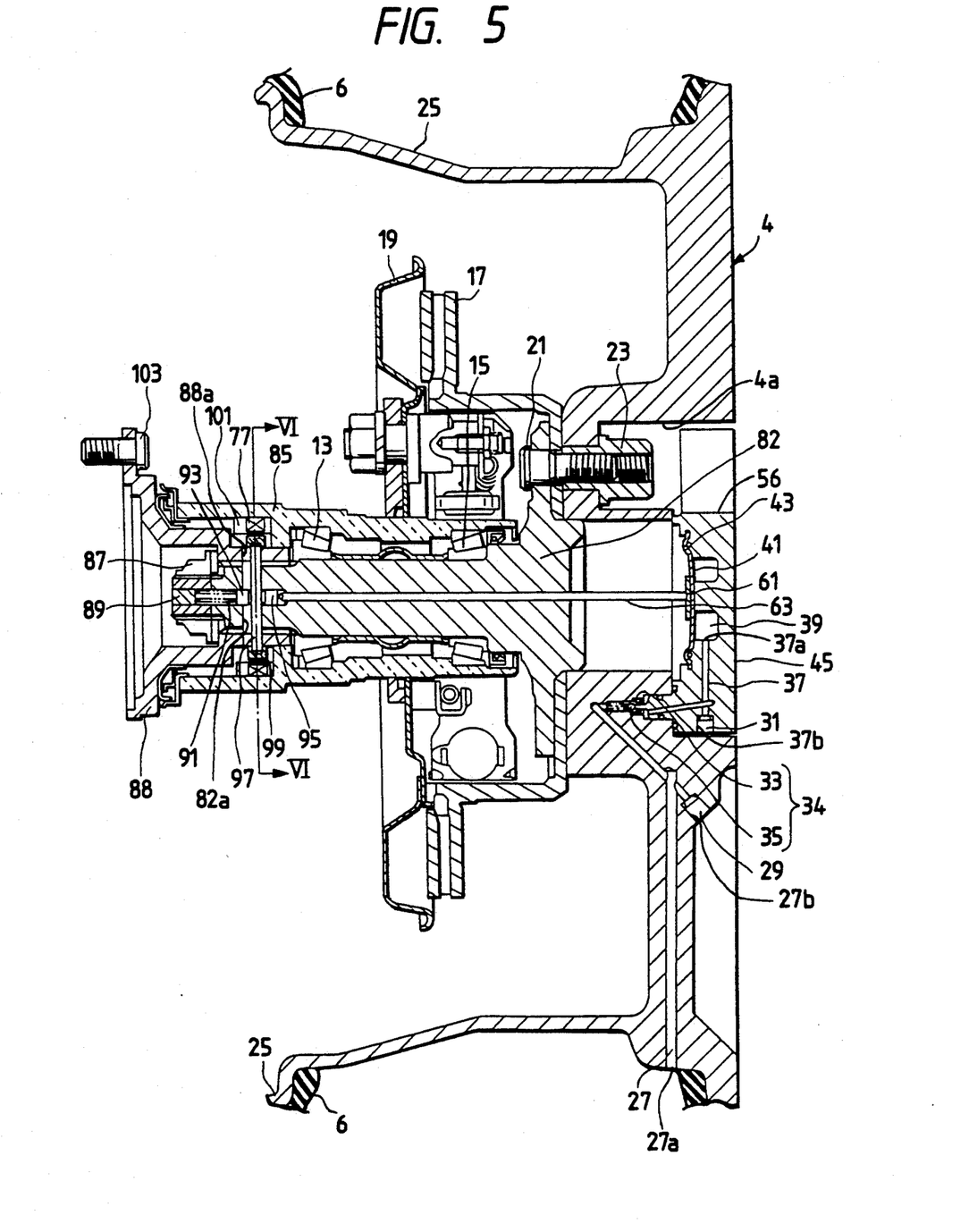
FIG. 5 is a cross-sectional view of a system for detecting the pneumatic pressure in a tire according to another embodiment of the invention, the tire being mounted on a drive wheel of a vehicle.

FIG. 5 shows in cross section a system for detecting the pneumatic pressure in a tire according to another embodiment of the invention, the tire being mounted on a drive wheel of a vehicle. Those parts shown in FIG. 5 which are identical or similar to those shown in FIG. 1 are denoted by identical reference characters, and will not be described in detail.

As shown in FIG. 5, a wheel shaft 82 for transmitting drive power from an engine to a wheel 4 rotates with the wheel 4. The wheel shaft 82 is fastened to the wheel 4 and the brake disc wheel 17 by bolts 21 and nuts 23. Therefore, the wheel shaft 82, the brake disc wheel 17, and the wheel 4 rotate in unison with each other. The wheel shaft 82 is rotatably supported by taper bearings 13, 15 in a housing bearing 85 is coupled to a vehicle body (not shown). Communication holes 27, 37, a check valve 34, and a diaphragm attachment 45, a diaphragm 41, a wear-resistant plate 61 are identical in structure to those shown in FIG. 1.

A flange 88 is splined to an inner end of the wheel shaft 82, and is retained thereon by a nut 87 which is threaded over the wheel shaft 82. The flange 88 is also fastened to a drive shaft (not shown) by a bolt 103. The flange 88 and the wheel shaft 82 have diametrical, axially elongate holes 88a, 82a through which a pin 97 extends. A ring 99 of a ferromagnetic material such as iron is fitted over the flange 88 and fixed to radially outer ends of the pin 97. The pin 97 is sandwiched in the center of the wheel shaft 82 between cylindrical pin cotters 93, 95. The pin cotter 93 is normally urged to displace the pin 97 to the right in FIG. 5 under the bias of a spring 91 in the wheel shaft 82. The spring 91 is retained in the wheel shaft 82 by a blind plug 89. The pin cotter 95 can be pushed to the left in FIG. 5 by a slide bar 63 which is slidably disposed in the wheel shaft 82 and whose outer end is held against the wear-resistant plate 61. When the slide bar 63 is axially displaced in the wheel shaft 82, the pin 97 is displaced in the axially elongate holes 82a, 88a in unison with the slide bar 63.

Figure 6:
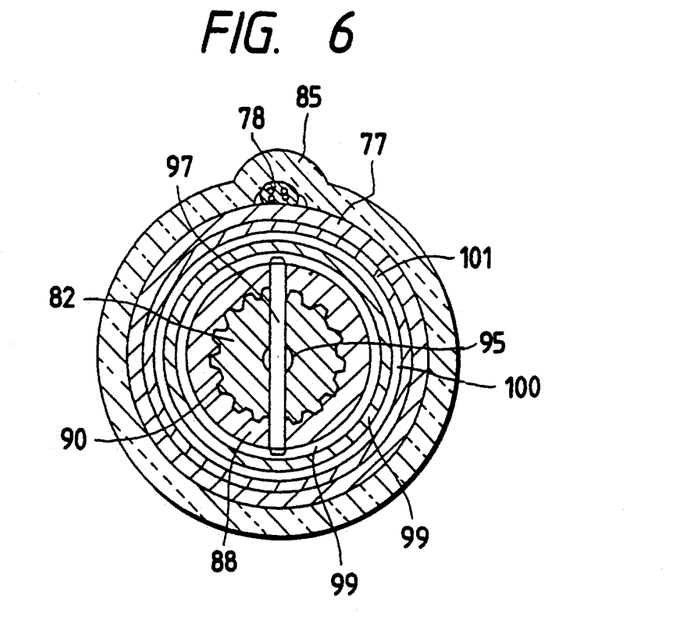
FIG. 6 is a cross-sectional view taken along line VI—VI of FIG. 5.

A bobbin 101 is disposed in the housing bearing 85 and radially outwardly spaced from the ring 99. A detector coil 77 is supported in the bobbin 101. The detector coil 77 is electrically connected to an ECU (not shown) which is electrically connected to a display unit (not shown). The detector coil 77 is electrically connected to the ECU by lead wires 78 (FIG. 6). The ECU and the display unit are identical to those shown in FIG. 1.

The tire pressure detecting system shown in FIGS. 5 and 6 operates as follows:

When the pneumatic pressure in the tire 6 varies, the pressure in the pressure chamber 39 also varies, displacing the diaphragm 41 with respect to the diaphragm attachment 45. The slide bar 63 held against the wear-resistant plate 61 and rotating with the wheel shaft 82 also slides axially in response to the displacement of the diaphragm 41. The pin 97 sandwiched between the pin cotters 93, 95 is also displaced in the holes 82a, 88a in unison with the slide bar 63. As a result, the ring 99 is axially displaced with respect to the detector coil 77, so that the inductance L of the detector coil 77 varies.

A signal indicative of the variation in the inductance L is sent from the detector coil 77 to the ECU, which then controls the display unit 81 to display the change in the pneumatic pressure in the tire 6.

In the above embodiments, the diaphragm 41 is positioned at the central axis about which the tire 6 rotates, and the slide bar 63 is slidably held at one end against the center of the diaphragm 41. Therefore, the diaphragm 41 and the slide bar 63 are not adversely affected by centrifugal forces generated when the tire 6 rotates. Since the diaphragm 41 is elastically displaced depending on the pneumatic pressure in the pressure chamber 39 that communicates with the interior of the tire 6, the diaphragm 41 can elastically be displaced depending on the pneumatic pressure in the tire 6 irrespective of whether the vehicle is running or not. Accordingly, the tire pressure detecting system of the present invention can detect the pneumatic pressure of the tire 6 even when the vehicle is at rest. The diaphragm 41 and the slide bar 63 are linearly displaced depending on the pneumatic pressure of the tire 6, and the displacement of the slide bar 63 is linearly detected by the detector coil 77. As a consequence, the tire pressure detecting system is capable of linearly detecting the pneumatic pressure of the tire 6.

Figure 7:
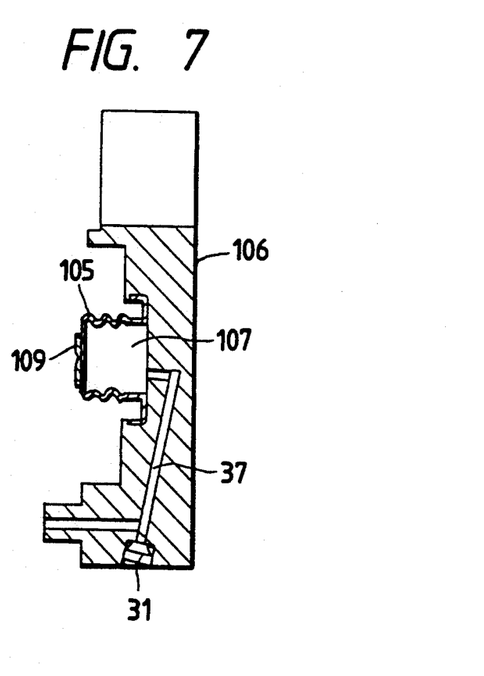
FIG. 7 is a cross-sectional view of a modified elastically displaceable element.

FIG. 7 shows a modified elastically displaceable element in the form of a bellows 105. The bellows 105 is fixed at its open end to a bellows attachment 106 mounted in the wheel. The bellows 105 defines a pressure chamber 107 therein which communicates with the interior of the tire. A wear-resistant plate 109 is bonded to the closed end of the bellows 105, for sliding engagement with the slide bar.

Figure 8:
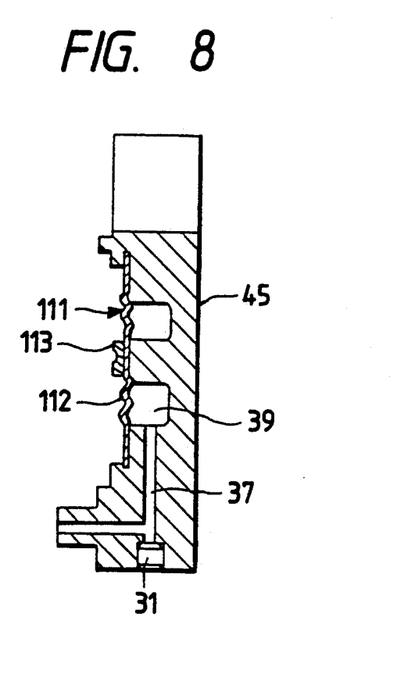
FIG. 8 is a cross-sectional view of another modified elastically displaceable element.

FIG. 8 shows another modified elastically displaceable element which comprises a diaphragm 111 having a corrugated region 112. The diaphragm 111 is fixed to the diaphragm attachment 45 at the peripheral edge of the pressure chamber 39. A wear-resistant plate 113 is bonded to the center of the diaphragm 111, for sliding engagement with the slide bar.

Although certain preferred embodiments of the present invention have been shown and described in detail, it should be understood that various changes and modifications may be made therein without departing from the scope of the appended claims.

What is claimed is:

1. A system for detecting a pneumatic pressure in a tire disposed on a wheel of a vehicle, comprising:
   a pressure-responsive element in the wheel on a central axis of said wheel, said wheel being rotatable about said central axis, said pressure-responsive element being displaceable along said central axis in response to any change in a pneumatic pressure in said tire;
   mechanical transmitter means in a non-rotating portion of the vehicle, contacting said pressure-responsive element, for providing a mechanical displacement along said central axis in response to a displacement of said pressure-responsive element; and
   detector means, coupled to said mechanical transmitter means, for detecting said pneumatic pressure of said tire based on said mechanical displacement, said detector means having electric means for converting said mechanical displacement into an electric signal, said electric means not being rotatable about said central axis.

2. A system according to claim 1, wherein said pressure-responsive element includes a diaphragm elastically displaceable along said central axis in response to a change in said pneumatic pressure in said tire, and said mechanical transmitter means includes a bar having a first end portion and a second end portion opposite to said first end portion, said first end portion engaging said diaphragm and movable along said central axis in response to said displacement of said diaphragm.

3. A system according to claim 2, wherein said detector means is positioned on said second end portion of said bar and said detector means includes a ferromagnetic member connected to said second end portion of said bar, said ferromagnetic member being movable with said second end portion of said bar when said bar moves along said central axis, and wherein said electric means includes a coil having an inductance variable in response to said movement of said ferromagnetic member.

4. A system for detecting a pneumatic pressure in a tire disposed on a wheel of a vehicle, comprising:
   a pressure-responsive assembly including a pressure-responsive element int he wheel positioned at a central axis of said wheel, about which said tire is rotatable, said pressure-responsive assembly being substantially free from centrifugal forces generated when said wheel rotates, said pressure-responsive assembly including a displaceable assembly contacting said pressure-responsive element which is displaceable in a non-rotating portion of the vehicle along said central axis in response to any change in said pneumatic pressure in the tire as sensed by the pressure-responsive element; and
   pressure detector means, coupled to said displaceable assembly, for detecting said displacement of said displaceable assembly, said pressure detector means including an electric signal generator for generating an electric signal in response to said detected displacement of said displaceable assembly, said electric signal generator being arranged on a portion of said vehicle which does not rotate.

5. A system according to claim 4, wherein said wheel has a passage for applying said pneumatic pressure in said tire to said displaceable assembly.

6. A system according to claim 5, wherein said pressure-responsive assembly includes a chamber which provides a closed space in cooperation with said displaceable assembly, said chamber serving as a pressure chamber in communication with said passage.

7. A system for detecting a pneumatic pressure in a tire disposed on a wheel of a vehicle, comprising:
   a pressure chamber positioned at a central axis about which said tire is rotatable;
   a passage defined in said wheel and providing communication between said pressure chamber and an interior of said tire;
   a diaphragm in the wheel positioned at said central axis and rotatable with said tire, said diaphragm being displaceable in response to any change in said pneumatic pressure in said pressure chamber, in a direction in which said diaphragm is substantially free from centrifugal forces generated when said tire rotates;
   a displacement-responsive member in a non-rotating portion of the vehicle contacting said diaphragm and movable along said central axis in response to said displacement of said diaphragm; and
   detector means for detecting said movement of said displacement-responsive member, said detector means having electric means, arranged on a portion of said vehicle which is free from rotation with said tire, for generating an electric signal corresponding to a position to which said displacement-responsive member has moved, said position corresponding to said movement of said displacement-responsive member.

8. A system for detecting the pneumatic pressure in a tire disposed on a wheel of a vehicle, comprising:
   a pressure chamber positioned at a central axis about which said tire is rotatable;
   a communication passage providing communication between said pressure chamber and an interior of said tire;
   displaceable means in the wheel, disposed at said central axis and rotatable with said tire, for being displaced along said central axis in response to any change in said pneumatic pressure in said tire as occurring in said pressure chamber;
   a slide bar in a non-rotating portion of the vehicle slidably engaging a center of said displaceable means and slidably displaceable along said central axis in response to said displacement of said displaceable means; and
   detecting means, coupled to said slide bar, for detecting said siding displacement of said slide bar, said detecting means having a detecting section on a vehicle portion which is free from rotation with said tire, said detecting section detecting said change in said pneumatic pressure in said tire based on said detected sliding displacement of said slide bar.

9. A system according to claim 8, further including a check valve disposed in said wheel for closing said communication passage only when said pressure chamber is detached from the wheel.

10. A system according to claim 8, wherein said displaceable means comprises a plain diaphragm attached in covering relation to said pressure chamber.

11. A system according to claim 8, wherein said displaceable means comprises a corrugated diaphragm attached in covering relation to said pressure chamber.

12. A system according to claim 8, wherein said displaceable means comprises a bellows defining said pressure chamber therein.

13. A system according to claim 8, further including a wheel shaft which is free from rotation with said tire, said slide bar sliding axially through said wheel shaft.

14. A system according to claim 8, further including a wheel shaft which is rotatable in unison with said wheel, said slide bar extending axially slidably through said wheel shaft.

15. A system according to claim 8, wherein said detecting means comprises a ferromagnetic member movable with said slide bar, and a coil disposed around said ferromagnetic member.

16. A system according to claim 15, further including an electronic control unit for generating a signal in response to a change in an inductance of said coil.

17. A system according to claim 8, further including a wear-resistant plate interposed between said slide bar and said displaceable means.

* * * * *